H. D. W. BAILEY.

Spring Bed-Bottoms.

No. 5,286. Reissued Feb. 18, 1873.

Witnesses.
C. F. Brown.
C. W. Fitch

Inventor.
H. D. W. Bailey.
by his Attys.
Hice & Ellsworth.

AM. PHOTO-LITHOGRAPHIC CO. N.Y. (OSBORNE'S PROCESS)

UNITED STATES PATENT OFFICE.

HENRY DWIGHT WRIGHT BAILEY, OF STERLING, ILLINOIS.

IMPROVEMENT IN SPRING BED-BOTTOMS.

Specification forming part of Letters Patent No. 107,213, dated September 13, 1870; reissue No. 5,286, dated February 18, 1873.

*To all whom it may concern:*

Be it known that I, HENRY DWIGHT WRIGHT BAILEY, of Sterling, in the county of Whitesides and State of Illinois, have invented certain new and useful Improvements in Spring Bed-Bottoms; and I do hereby declare the following to be a full and exact description of the same, reference being had to the accompanying drawing forming part of this specification, in which—

Figure 1:
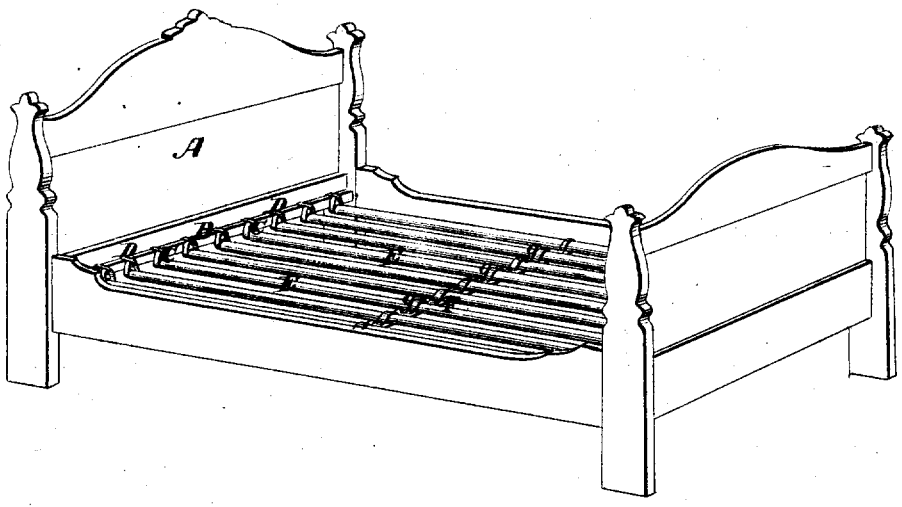
Figure 2:
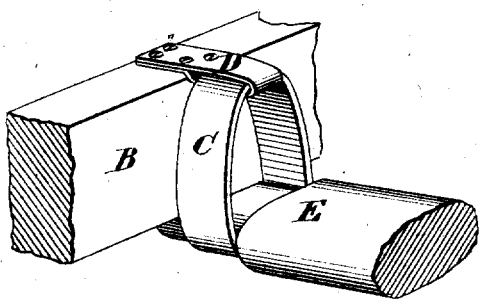

Figure 1 is a perspective view of a bedstead, showing the application of my improvements; and Fig. 2 is a perspective view of parts, showing the connection of a slat with its spring-support.

Similar letters of reference in the accompanying drawing indicate the same parts.

My invention has for its object to improve the construction and efficiency of that class of bed-bottoms which are composed of slats supported at or near their ends by suitable springs; to this end the invention consists, first, in connecting the slats by a flexible medium for the purpose of preserving their elasticity and freedom of motion, and in adapting them for reversal separately while thus connected, and without being removed from the supporting-springs and connecting medium, and so that one or more slats may be taken from the bed-bottom without disturbing the remainder.

The flexible connection admits the use of much thinner and therefore more elastic slats, because the loss of strength in one is compensated for by the distribution of the weight throughout the whole number, while the adaptation of the slats for reversal overcomes the common difficulty of sagging or warping.

The invention consists, secondly, in the combination of parts, as I will now proceed to describe.

In the accompanying drawing, A is a bedstead, of ordinary construction, to which my improved bed-bottom is applied; and B B are strips or rails, adapted for attachment to the inner side of the bedstead at the head and foot. C C are springs, composed of India rubber or other elastic material, and in this example of my invention are made in the form of loops. They are suspended upon the proximate sides of the rails B, by means of leather straps or loops D nailed or otherwise secured to the rails at equal distances apart. If desired, strips of canvas or other strong material may be employed for the loops D instead of leather. E are the wooden slats, formed with a tenon upon each end, and arranged longitudinally within the bed bottom parallel to each other. The tenons of the slats are inserted in the elastic loops or springs C, which are prevented from sliding upon the slats by the shoulders of the tenons. The rails B, beneath which the tenons extend, may also assist in preventing the slats from sliding within the loops.

By this connection the slats are permitted a vertical play, but cannot rise above the rails B to become detached from the loops. Their lateral displacement is also prevented by the rails B.

For the purpose of uniting the slats by a flexible connection a leather strap, F, is employed, having a series of loops, *g*, through which the slats are passed, the strap being extended transversely across the whole number of slats at or near the center of the bed-bottom.

This special form of connection need not necessarily be employed, as any other form having flexibility may be used with the same effect.

By this method of connecting the slats, when one is depressed it carries with it those adjacent, and therefore distributes the weight upon a number or all of the slats. It also permits freedom of motion in the slats, and enables them to be made lighter and thinner, and, consequently, more elastic, than could otherwise be the case.

When the slats have been used to sustain a weight for any considerable time, they are liable to become bent or bowed downward in the center, and, as a consequence, render the bed uncomfortable to rest upon. My invention overcomes this objection, as it permits the slats to be turned over or reversed separately without removing them from the springs or connecting-loop, and, therefore, without lifting the bed-bottom from the bedstead. It also permits the removal of a broken slat and the insertion of a new one in its place without disturbing any of the others.

Having thus described my invention, what I claim is—

1. A bed-bottom composed of slats supported by springs and flexibly connected to each other, so that one or more may be reversed or removed from the springs and connection without unfastening or removing the remainder, substantially as described, for the purpose specified.

2. The combination of the rails B, slats E, elastic loops or springs C, loops D, and flexible strap F, substantially as described, for the purposes specified.

HENRY DWIGHT WRIGHT BAILEY.

Witnesses:
O. S. CLARK,
C. N. LEGG.